United States Patent [19]

Clemenz

[11] Patent Number: 4,951,379
[45] Date of Patent: Aug. 28, 1990

[54] METHOD FOR CONNECTING WIRES TO TERMINALS HAVING TANGS AND CUTTING THE WIRES AT THE TERMINALS

[75] Inventor: Gary E. Clemenz, Greene County, Ohio

[73] Assignee: Globe Products Inc., Huber Heights, Ohio

[21] Appl. No.: 412,316

[22] Filed: Sep. 25, 1989

[51] Int. Cl.⁵ ............................................. H02K 15/09
[52] U.S. Cl. ........................................ 29/597; 29/598;
242/7.03; 242/7.05 B; 310/234
[58] Field of Search ................ 29/597, 598, 7.32, 7.36,
29/605; 242/7.03, 7.05 B, 7.05 A, 7.05 C;
310/234

[56] References Cited

U.S. PATENT DOCUMENTS

| | | |
|---|---|---|
| 3,713,208 | 1/1973 | Doyle . |
| 3,812,577 | 5/1974 | Compton et al. . |
| 4,428,113 | 1/1984 | Fischer et al. . |
| 4,553,319 | 11/1985 | Fischer et al. . |
| 4,633,577 | 1/1987 | Banner . |
| 4,827,601 | 5/1989 | Banner . |

FOREIGN PATENT DOCUMENTS 2013533 8/1979 United Kingdom .
2092029 8/1982 United Kingdom .

*Primary Examiner*—Carl E. Hall
*Attorney, Agent, or Firm*—Roger S. Dybvig

[57] ABSTRACT

A method of connecting a wire segment, such as a stator coil lead, to a terminal having a tang and severing the wire segment at the terminal including the steps of gripping the wire segment by gripper jaws of an industrial robot, manipulating the gripper jaws to lay the wire segment between one side of the tang and the adjacent face of the terminal, loop the wire segment around an edge of the tang, extend it past the tang, bend it over an edge of the terminal, and pull it with sufficient force that it stretches and breaks at a corner of the terminal edge. The wire segment is initially gripped with a sufficiently low pressure that it can slide along the gripper jaws as it is being manipulated to connect the wire to the terminal. The gripping pressure is increased prior to the pulling step so that sufficient pressure is applied that the free end of the wire segment is held clamped and will not be drawn through the gripper jaws when the wire segment is being stretched and severed.

5 Claims, 3 Drawing Sheets

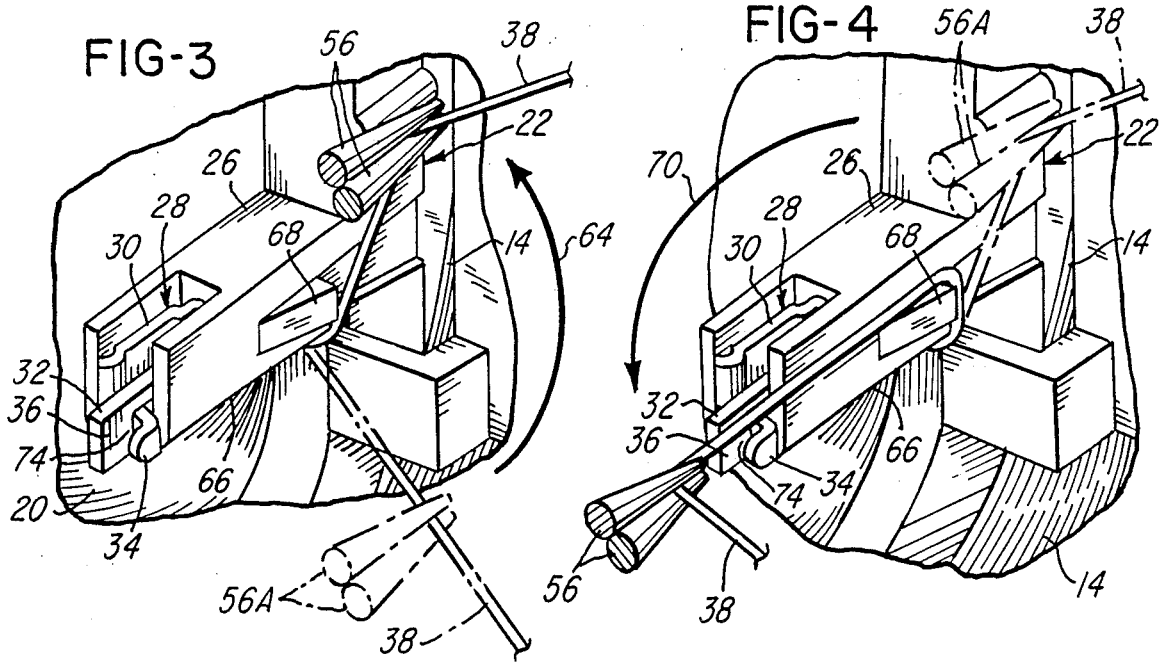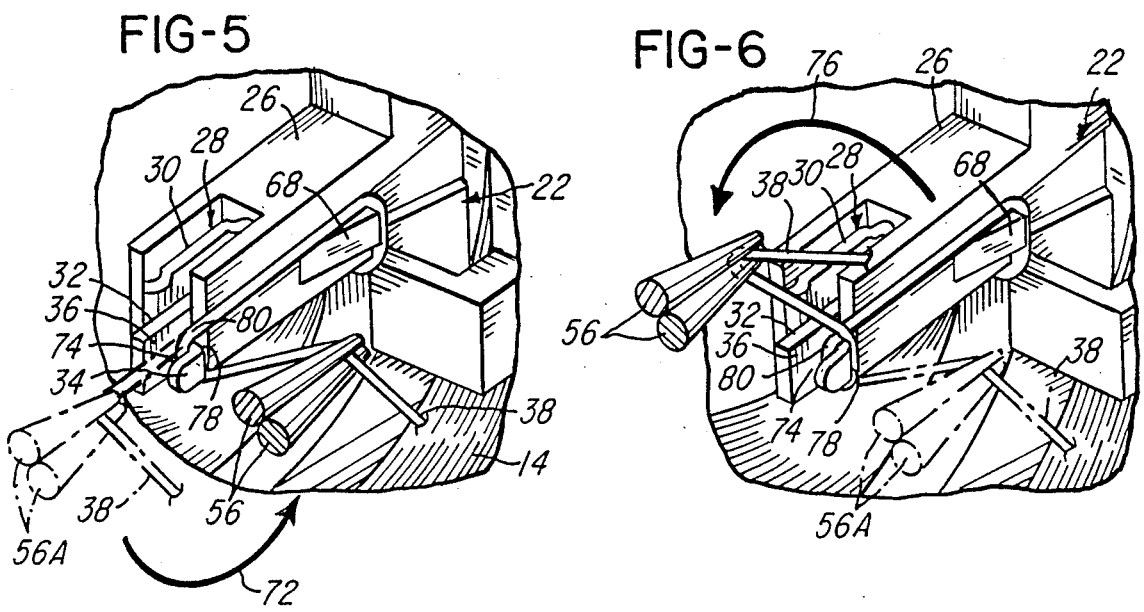

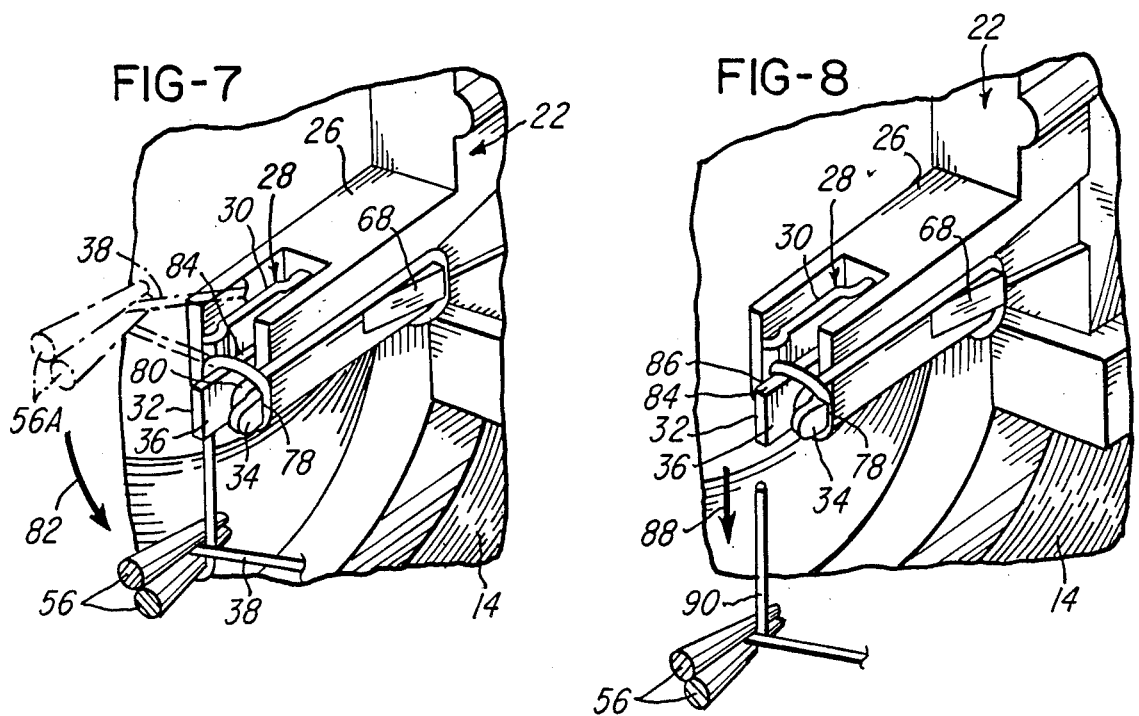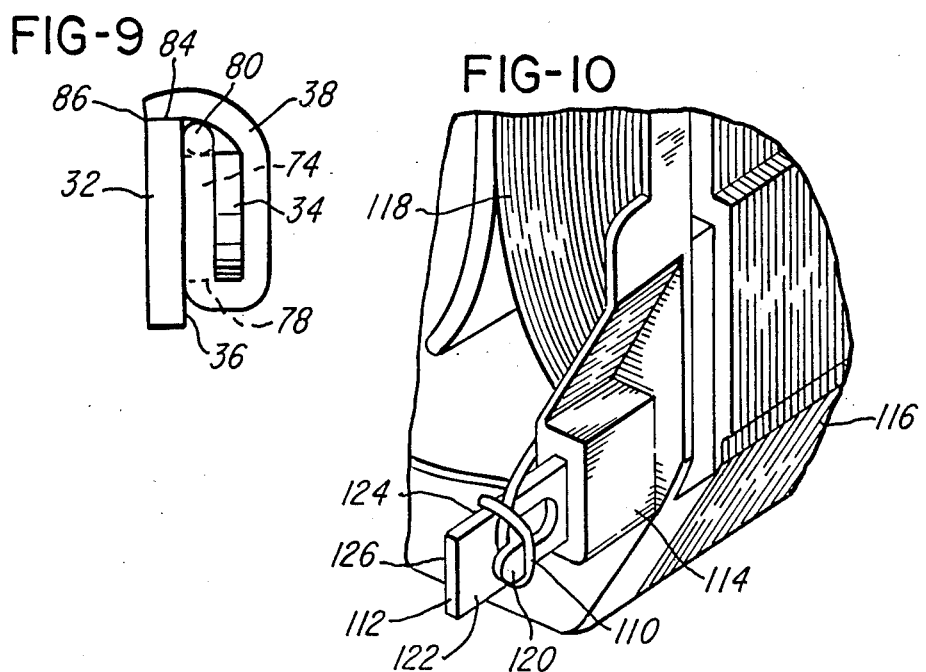

METHOD FOR CONNECTING WIRES TO TERMINALS HAVING TANGS AND CUTTING THE WIRES AT THE TERMINALS

SUMMARY OF THE INVENTION

This invention relates to a method for connecting wires to terminals having tangs and cutting the wires at the terminals and to products produced by the method. The invention is primarily directed to a method for connecting wire coil leads of electric motor stators but may be used with numerous other products having such terminals.

Two pole stators for universal electric motors typically have a pair of coils comprising magnet wire having an insulating coating wound around pole pieces formed on a laminated core. Each coil has two or more wire leads extending therefrom. A practice that has become commonplace in recent years is to mount terminals having lead-clamping hooks or tangs on the stator cores adjacent the coils to which the coil leads are connected. Such a terminal often is in the form of a flat plate or a U-shaped clip and has a wire-clamping tang struck outwardly from one of its faces.

In preparation for connection of coil leads to terminals, having lead-clamping tangs, each of the coil leads may be cut at the end of the coil winding process with a sufficient length that it can be held by a stationary wire clamp in a position wherein it extends across the face of the stator and past its associated terminal so that it may be mechanically manipulated to be connected to the terminal. In order to achieve connection of a coil lead to a terminal, the practice has been to advance a movable wire gripper toward the coil lead, manipulate the movable gripper to lay the wire lead in the trough formed between the wire-clamping tang and the adjacent face of the terminal, peen the tang over the wire lead so that the lead is clamped between the tang and the adjacent face of the terminal, cut the wire lead adjacent the terminal, and retract and open the wire gripper to dispose of the excess wire. In a later step, usually accomplished at a different processing station, the coil leads are fused to the terminals by a welder. The heat of fusion melts the insulating coatings from the wires so that adequate electrical connections between the coil leads and the terminals are obtained.

Portions of the foregoing manufacturing processes can be done manually but the more common practice is to use automatic machines. The wire handling, tang peening, and wire-cutting mechanisms of such machines are somewhat complex and the machines are usually tooled so that each machine is dedicated to the manufacture of but one stator configuration. If it is desired to use the machine for manufacturing a differently configured stator, the machine must be practically completely rebuilt.

An object of this invention is to provide an improved method for connecting wire segments to terminals having tangs. More particularly, it is an object of this invention to provide an improved method for connecting wire coil leads of stator coils to terminals having tangs.

A further object of this invention is to connect a wire segment, such as a stator coil lead, to a terminal having a tang with sufficient security that no additional means or method, such as a peening operation, is required to hold the wire segment on the terminal during subsequent processing until the wire segment is fused to the terminal.

A still further object of this invention is to dispense with the need in an automatic terminal connecting machine to provide cutting means to cut a wire segment connected to a terminal.

In an aspect of this invention, the method of connecting a wire segment to terminal having a tang and severing the wire segment at the terminal includes the steps of gripping a wire segment having fixed end and a free end sufficiently near its fixed end that the stretch of wire between its fixed end and its gripped portion can be controllably manipulated. (If this stretch of wire is too long, it may be too flexible or rubbery to enable it to be satisfactorily handled during the terminal connection and wire cutting process.) The wire segment may comprise a stator coil lead in which case its fixed end is at the stator coil and, in a common practice, its free end is releaseably held by a clamp device stationarily mounted with respect to the stator core. The gripped wire segment is laid between one side of the tang and the adjacent face of the terminal, looped around an edge of the tang, extended past the tang, bent over an edge of the terminal, and pulled with sufficient force that it stretches and breaks at a corner of said terminal edge.

Another object of this invention is to provide a method whereby a wire segment may be connected to a terminal having a tang by an industrial robot without the need for dedicated tooling specific to a particular product or device, such as a uniquely configured stator for electric motors. Accordingly, one industrial robot may be programmed so that it can make terminal connections and sever the terminal wires for many different stators or other devices. During intervals when the robot is not carrying out the method of this invention, it may also be used for other purposes, such as, for example, unloading stator cores or other devices.

In a preferred practice of this invention, a wire segment is gripped by gripper means of an industrial robot which gripper means is controllable to apply different gripping pressures to the wire segment. The wire segment is initially gripped with a pressure sufficiently low that it can slide along the gripper means as it is being manipulated to connect it to the terminal. The gripping pressure is increased prior to the pulling step so that sufficient pressure is applied that the free end of the wire segment is held clamped and will not be drawn through the gripper means when the wire segment is being stretched and severed.

To retain optimum control of the stretch of wire between its gripped portion and its fixed end, the movements of the gripper means is in directions such that, if possible, the wire segment would be pulled from its fixed end. Since the wire segment cannot be pulled from its fixed end, the gripper means slides along the wire segment toward the free end the wire segment as portions of the wire segment accumulate on the terminal. Accordingly, the stretch of the wire segment between its fixed end and its clamped portion remain taut throughout the wire connection and severing process.

Other objects and advantages will become apparent from the following description and the drawings.

BRIEF DESCRIPTION OF THE DRAWINGS

FIGS. 3 through 8 are enlarged, fragmentary perspective views similar to FIG. 2 and illustrate in succession the steps for completing the connection of the coil lead to the terminal and the severing of the coil lead.

FIG. 9 is an end elevational view of the portion of the terminal to which the wire lead is connected in accordance with this invention and the coil lead connected thereto.

FIG. 10 is a fragmentary perspective view of a stator having a terminal configuration that differs from the terminal of the stator illustrated in FIGS. 1 through 9 and to which a coil lead has been connected in accordance with the method of this invention.

DETAILED DESCRIPTION

Figure 1:
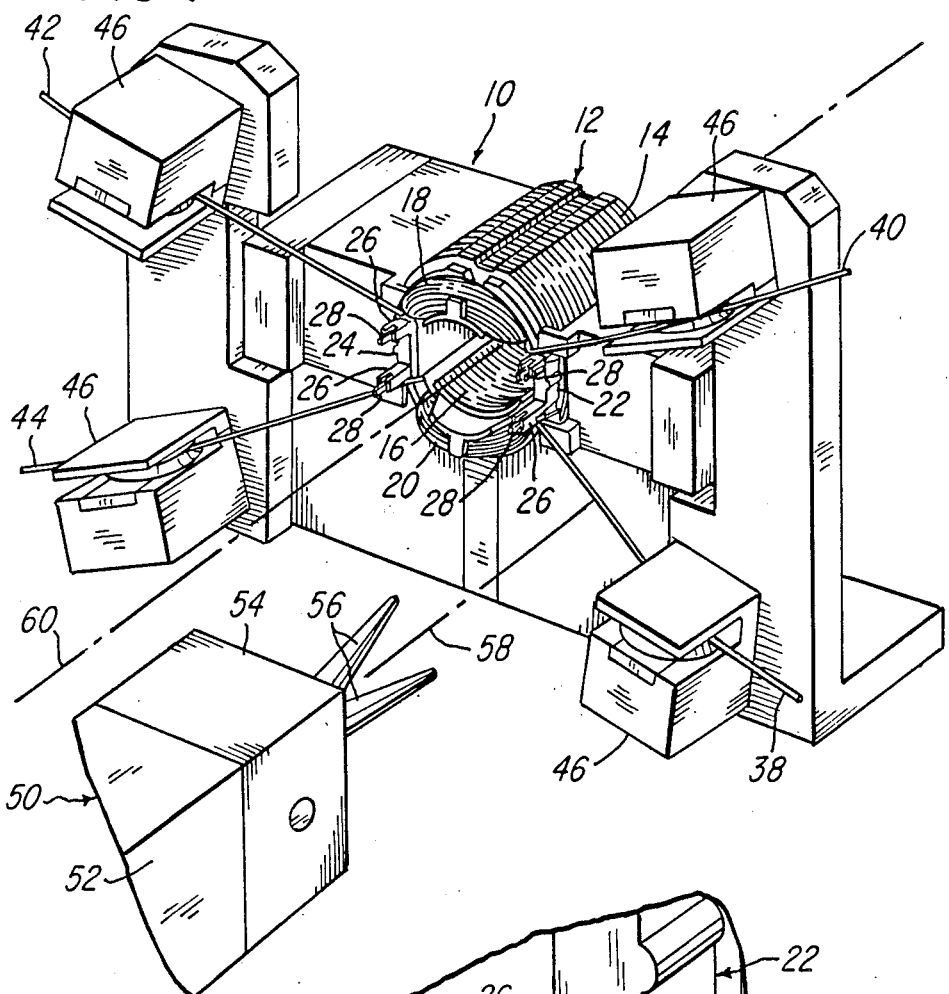
FIG. 1 is a simplified and fragmentary perspective view of a wound stator with coil leads extending from the coils wound thereon, a support for the stator, stationary wire clamps for holding the coil leads, and a portion of a robot for connecting the coil leads to terminals on the stator core in accordance with this invention. The parts are shown positioned in FIG. 1 preliminary to connecting the leads to the terminals.

FIG. 1 fragmentarily illustrates one stage of a multistage production line for producing stators for electric motors. The structure fragmentarily illustrated comprises a stator support assembly 10 that supports and clamps a stator 12 of the type comprising a laminated stator core 14 having pole pieces 16 about which a pair of stator field coils 18 and 20 are wound. At the production stage illustrated, the stator 12 is only partially completed and lack terminal connections by which electrical energy would be supplied to the field coils.

During the terminal connecting and coil lead cutting process described below, the stator support assembly 10 is stationary. Those familiar with the art will recognize that the stator support assembly 10 may form part of a turret or other workpiece handling machinery by which the support assembly is moved into a station at which the method of this invention is practiced and thereafter moved out of the station so that the method can be repeatedly carried out on successive stators.

As will be understood by those familiar with the art, a number of operations leading toward completion of the stator 12 have already been performed. In a preceding manufacturing step, a pair of terminal boards 22 and 24 were mounted on the stator core 14 in face-contacting relation to the end face of the stator core 14. It will be noted that the terminal boards 22 and 24 lie adjacent the pole pieces 16. The terminal boards 22 and 24 are preferably molded plastic pieces and have upstanding sockets 26, one of which is shown enlarged in FIGS. 2 through 8, projecting therefrom. The sockets 26 project outwardly from the terminal boards 22 and 24 in a direction generally perpendicular to and outwardly from the stator core 14.

Prior to the time the coils 18 and 20 are wound, metal terminals 28 are inserted into the sockets 26. The terminals 28 are constructed to interfit with mating connectors in the final assembly of the motor of which the stator 12 is a part. Terminals such as this may have various different configurations. The particular terminal 28 illustrated in FIGS. 1 through 9 comprises a U-shaped spring clip having a first leg 30 lodged within the socket 26 and second leg 32 that projects out of the socket 26. A terminal tang 34, which may be struck out of the second terminal leg 32 projects from the outer face, designated 36, thereof.

Also in a prior production stage, after the coils 18 and 20 are wound, the wire coil leads, designated 38, 40, 42, and 44, respectively, extending from the ends of the field coils 18 and 20 are gripped by suitable clamp assemblies 46 fixedly mounted on the stator support assembly 10. The depiction of the clamp assemblies 46 in FIG. 1 is somewhat simplified since they do not form part of this invention. They exert clamping pressures on the coil leads sufficient to retain them oriented as shown in FIG. 1 until the leads are pulled from the clamps. The clamps may be spring powered or may be powered by air actuators or other suitable means. Also in a prior operating stage, the free ends of the coil leads 38, 40, 42, and 44 are cut to the desired length so that their free ends project beyond the clamps 46.

As a result of the prior operations mentioned above, each of the coil leads 38, 40, 42, and 44 is extended from its stator coil 18 or 20, across the end face of the stator core 14, past its respective terminal 28, and through its respective stationary clamp 46. The present invention is concerned with a method by which the coil leads 38, 40, 42, and 44 are connected to the terminals 28 after the parts have reached the position shown in FIG. 1 and the excess length thereof severed at the terminals 28.

In its broader aspects, the method of this invention may be carried out manually but it is particularly intended, for high speed production purposes, to be carried out by an industrial robot generally designated 50. The portion of the robot 50 shown in the drawings includes an arm 52 and a gripper member 54 having a pair of gripper jaws 56. For reasons which will become apparent, the gripper jaws 56 are so controlled that the clamping pressures applied by them can be varied. For example, as will be readily recognized by those familiar in the art, the gripper jaws 56 may be controlled by a variable air actuator. Otherwise, the robot 50 may be entirely conventional and is not further illustrated herein. Although different types of robots may be useful in the practice of this invention, a three-axis Cartesian robot, such as is available from Hirata Corporation of America, 3901 Industrial Blvd., Indianapolis, Indiana 46254, is presently preferred.

Figure 2:
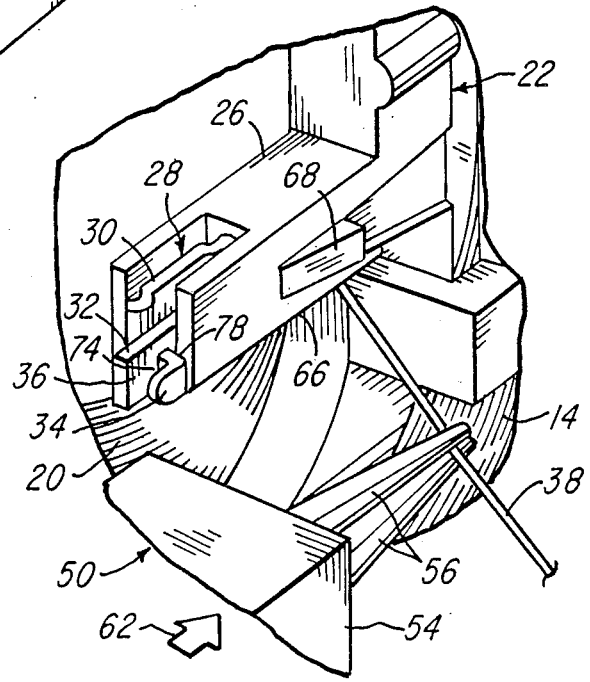
FIG. 2 is an enlarged, fragmentary perspective view of a portion of the stator of FIG. 1 and a portion of the robot and illustrates a first step in the method of connecting a coil lead to a terminal and severing the coil lead in accordance with this invention.

With reference to FIGS. 1 and 2, a secure connection of the coil lead 38 to the second leg 32 of its associated terminal 28 commences in accordance with this invention by the advancement of the robot arm 52 along an axis 58 parallel to the axis, designated 60, of the stator 12 clamped to the stator support assembly 10. After the robot arm has moved, as indicated by the arrow 62 in FIG. 2, to a position wherein the gripper jaws 56 straddle the coil lead 38, movement of the arm 52 is stopped and the jaws 56 are actuated to grip the coil lead 38 as shown in FIG. 2. The gripped portion of the coil lead 38 is between its associated terminal support socket 26 and its free end but much closer to its terminal socket 26 than to its free end so that the stretch of the coil lead between the coil from which it extends and the gripper jaws 56 is sufficiently short that it does not flex or buckle uncontrollably during the manipulations of the gripper jaws 56.

When the coil lead 38 is first gripped by the gripper jaws 56, the clamping pressure of the gripping jaws 56 is sufficiently low that the gripper jaws 56 will slide along the coil lead 38 as portions of the coil lead 38 are extended over parts of the terminal leg 32. At a later stage, described below with reference to FIG. 8, the clamping pressure is increased so that the coil lead is firmly clamped when the wire lead is stretched and severed against the terminal leg 32.

The stationary clamp assemblies 46 are preferably operable so that their grip on the coil leads can be released. If so, the stationary clamp assembly 46 associated with the coil lead 38 is operated to release its grip thereon after the coil lead 38 is gripped by the gripper jaws 56. Optionally, the stationary clamp assemblies 46 may clamp the coil leads with such a low clamping pressure that it would not be necessary to release the leads; the leads will simply be pulled from their respective clamps by subsequent processing steps.

With the coil lead 38 held clamped by the gripper jaws 56, the robot arm 52 is manipulated through a continuous series of steps illustrated in FIGS. 3 through 7 to securely connect the coil lead 38 to the terminal leg 32. The movements of the gripper jaws 56 are shown sequentially in each of FIGS. 3 through 7, with the starting position for each figure shown by phantom lines 56A and the ending position shown by full lines 56. The starting position for each of FIGS. 3 through 7 is the same as the ending position of each of the preceding FIGS. 2 through 6, respectively.

In accordance with this invention, the clamp jaws 56 are so manipulated, as indicated by the arrow 64 in FIG. 3, that the coil lead 38, which was originally extended below the lower surface of its socket 26, is bent upwardly around the lower, outer corner 66 of the socket 26 and extended behind a wire-support protuberance 68 located on the outer side face of the socket 26 as shown in FIG. 3.

The coil lead 38 is then extended outwardly from the face of the stator core 14 along the length of the terminal support socket 26 by a movement of the gripper jaws 56 away from the stator core as indicated by the arrow 70 in FIG. 4. Many terminals do not have a wire-support protuberance such as the protuberance 68 and the manipulation of the coil lead 38 by the jaws 56, as thus far described, will be unneccessary with many terminals.

FIG. 5 illustrates a key step in the practice of the method in accordance with this invention by which the gripper jaws 56 are moved, as indicated by the arrow 72, vertically downwardly and then horizontally toward the stator core 14 to first lay the coil lead 38 in the trough, designated 74, formed between the tang 34 and the first face 36 of the terminal leg 32 and to then pull the coil lead 38 toward the stator core 14. In consequence, the segment of the coil lead 38 is coursed over the tang 34 exerts a pulling force on the terminal 28 tending to keep it seated within its socket 26.

Here it should be noted that the length of the unsupported stretch of the coil lead 38 between the the gripper jaws 56 and parts of the terminal 28 and its socket 26 which are engaged by the coil lead 38 remains substantially constant throughout the lead connection process. This is because the gripper jaws 56 slide along the coil lead 38 toward its free end as needed to accommodate the lengths of the coil lead 38 coursed over the terminal 28 and its socket 26. This stretch of wire also stays relatively taut because all of the movements of the gripper jaws 56 are in a direction tending to pull the coil lead 38 from its fixed end. Accordingly, such stretch of wire is relatively short and taut and, therefore, remains controllable throughout the process.

FIG. 6 illustrates another key step in the method of this invention by which the gripper jaws 56 are first moved, as indicated by the arrow 76 in FIG. 6, in a generally circular, counterclockwise, direction to extend the portion of the coil lead 38 exiting from the trough 74 around the outer side of the tang 34, thereby hooking or looping the coil lead 38 about an edge 78 of the tang 34 and around the stretch, designated 80, of the coil lead 38 entering the lead-receiving trough 74. The coil lead 38 is also thereby extended over the upper edge, designated 84 in FIGS. 7 through 9, of the second terminal leg 32.

The jaws 56 are then moved generally downwardly, as indicated by the arrow 82 in FIG. 7, whereupon the coil lead 38 is extended downwardly along the backside of the terminal leg 32 and brought into engagement with the upper edge 84. By virtue of the preceding steps, the coil lead 38 is looped around an edge of the tang 34, extended over itself, and also bent around the upper edge 84 of the terminal leg 32.

With reference to FIGS. 8 and 9, the free end of the coil lead 38 is now severed from the portion thereof connected to the terminal leg 32 by the simple expedient of pulling downwardly on the free end of the coil lead 38 with sufficient force that the coil lead 38 is stretched over the top rear corner 86 of the terminal leg 32 to the point that it breaks at that corner. This step is accomplished by moving the jaws 56 downwardly as shown by the arrow 88 in FIG. 8 until the coil lead 38 breaks against the terminal leg corner 86, leaving a severed wire remnant 90 in the jaws 56. Prior to the downward, wire-severing movement of the jaws 56, their clamping pressure is increased so that they firmly clamp the free end of the coil lead 38 and will not slide off the coil lead 38 as the lead is being stretched and broken. It may be noted in FIG. 9, which shows the final connection of the coil lead 38 to the terminal leg 32, that the severed end of the lead 38 has a somewhat reduced diameter because of the stretching of the lead that occurs prior to breakage. The coil lead 38 is now tightly wrapped around the terminal tang 34 in a configuration resembling the Greek letter alpha.

During the wire-breaking movement of the gripper jaws 56 illustrated in FIG. 8, the jaws should be so oriented that the stretch of the coil lead 38 between the jaws 56 and the terminal corner 86 engages over only smoothly curved surfaces of the gripper jaws 56 to insure that the coil lead does not break at a jaw surface rather than at the terminal corner 86. As an alternative, the gripper jaws 56 could be so oriented that the such stretch of the coil lead 38 extends vertically between the mutually confronting jaw surfaces that clamp the lead so that such stretch of the lead does not lie along an outside surface of either of the jaws 56.

After the connection and breaking of the coil lead 38 as described above, the griper jaws 56 may be spread apart to release the wire remnant 90 and then repositioned to sequentially connect and sever the coil leads 40, 42, and 44. The connection and severing of the coil leads 40, 42, and 44 to the other terminals will proceed using the method described above, except for differences in movements of the jaws 56 necessitated by the different locations of the coil leads relative to their respective terminals. Thus, for example, the first movement of the gripper jaws 56 after gripping the coil lead 40 would be downwardly rather than upwardly as in the case of the coil lead 38.

FIG. 10 shows a modified terminal arrangement wherein a coil lead 110 is connected to a plate-like terminal 112 mounted in a socket 114 on a stator core 116.

Here the lead 110 is extended directly from its associated coil 118 around a tang 120 struck from a first face 122 of the the terminal 112 and then to the top corner 124 of the second face 126. The method of connecting the coil lead 110 and breaking it at the corner 124 is that same as that described above, except that there is no protuberance, such as the protuberance 68, on the sockett 114 about which the coil lead 110 must be coursed. Accordingly, the wire grippers are first manipulated to grip the coil lead 110 and then moved to lay the coil lead between the tang 120 and the first terminal face 122. The remaining steps to connect and sever the wire lead 110 are the same as those described above with respect to the coil lead 38 after it is laid into the trough 74.

Tests have shown that coil lead connected and broken in accordance with this invention are connected to their terminals with sufficient reliability that the method of this invention may be used in the mass production of stators. Furthermore, the lead connections to the terminals are sufficiently secure that there is no need to peen the tang over the lead at the completion of the lead connection and breaking steps of this invention. Instead, the stator may undergo further processing prior to the fusion of the leads to the terminals without additional attention to the leads and terminals.

Although the presently preferred embodiments of this invention have been described, it will be understood that within the purview of this invention various changes may be made within the scope of the appended claims.

I claim:

1. A method for connecting a wire segment having a fixed end and a free end to a terminal having a tang projecting from one face thereof and a side edge, said method comprising the steps of:
    laying a portion of said wire segment between one side of said tang and said face of said terminal;
    looping said wire segment around the other side of said tang;
    extending said wire segment past said tang and bending said segment so that a portion of said segment between said tang and said free end of said segment is extended over said edge of said terminal; and
    pulling said wire segment with sufficient force that said wire segment is so stretched that it breaks at a corner of said edge of said terminal.

2. The method of claim 1 further comprising the step of gripping said wire segment by gripper means which is controllable to apply different gripping pressures to said wire segment, initially gripping said wire segment with a pressure sufficiently low that said wire segment may be drawn through said gripper means as said wire segment is being looped around said tang and bent around said edge, and increasing the gripping pressure applied to said wire segment by said gripping means after said wire segment is bent over said edge and before said pulling step so that said wire segment is gripped with sufficient pressure that said wire segment will not be drawn through said gripping means when said wire segment is being broken.

3. A method for connecting a wire coil lead wire extending from a stator coil wound on a stator core and having a free end relatively loosely held by a wire clamp to a terminal projecting from an end face of said stator core and having a tang projecting from one face thereof and a side edge, said method comprising the steps of:
    laying a portion of said coil lead between one side of said tang and said face of said terminal;
    looping said coil lead around the other side of said tang;
    extending said coil lead past said tang and bending said coil lead so that a portion of said coil lead between said tang and said free end is extended over said edge of said terminal; and
    pulling said coil lead with sufficient force it is so stretched that it breaks at a corner of said edge.

4. The method of claim 3 further comprising the step of gripping said coil lead by gripper means which is controllable to apply different gripping pressures to said coil lead, initially gripping said coil lead with a pressure sufficiently low that said coil lead may be drawn through said gripper means as said coil lead is being looped around said tang and bent around said edge, and increasing the gripping pressure applied to said coil lead by said gripping means after said coil lead is bent over said edge and before said pulling step so that said coil lead is gripped with sufficient pressure that said coil lead will not be drawn through said gripping means when said coil lead is being broken.

5. For use in the manufacture of electric motor stators of the type comprising a stator core with pole pieces around which wire coils are wound, terminal supports mounted on the stator core, and terminals mounted in and projecting from said terminal, a method for connecting a wire coil lead wire extending from said stator coil past said terminal and having a free end held by clamp means remotely from said stator core, said terminal comprising a sheet member having substantially parallel first and second faces, a pair of side edges joining to said faces to form corners therebetween, and said terminal further comprising a tang projecting from said first face, said method comprising the steps of:
    gripping said coil lead by pressure-controllable gripper means at a point between said terminal and said free end and nearer said terminal than said free end with a pressure sufficiently low that said coil lead may be drawn through said gripper means;
    moving said gripper means as needed to lay a portion of said coil lead between one side of said tang and said first face of said terminal, to thereafter loop said coil lead around the other side of said tang, to extend said coil lead past said tang over said first face, to loop said coil lead over one of said side edges, and to extend said coil lead along said second face of said terminal;
    increasing the gripping pressure applied to said coil lead by said gripper means; and
    pulling said coil lead with force sufficient that it is stretched and broken at the corner of said terminal between said last mentioned side edge and said second face of said terminal.

* * * * *

UNITED STATES PATENT AND TRADEMARK OFFICE
CERTIFICATE OF CORRECTION

PATENT NO. : 4,951,379
DATED : August 28, 1990
INVENTOR(S) : Gary E. Clemenz

It is certified that error appears in the above-identified patent and that said Letters Patent is hereby corrected as shown below:

Column 8, line 35, "terminal" should read --terminal supports--
Column 8, line 37, "said terminal" should read --one of said terminals--
Column 8, at lines 38 and 39, lines 41 and 42, line 45, line 46, line 51, line 56, line 60 and line 62, "said terminal" should read --said one of said terminals--.

Signed and Sealed this

Sixteenth Day of August, 1994

Attest:

BRUCE LEHMAN

*Attesting Officer*  *Commissioner of Patents and Trademarks*